Oct. 13, 1925.  
L. P. HALLADAY  
VEHICLE SUSPENSION  
Filed July 5, 1923  
1,556,931  
2 Sheets-Sheet 1
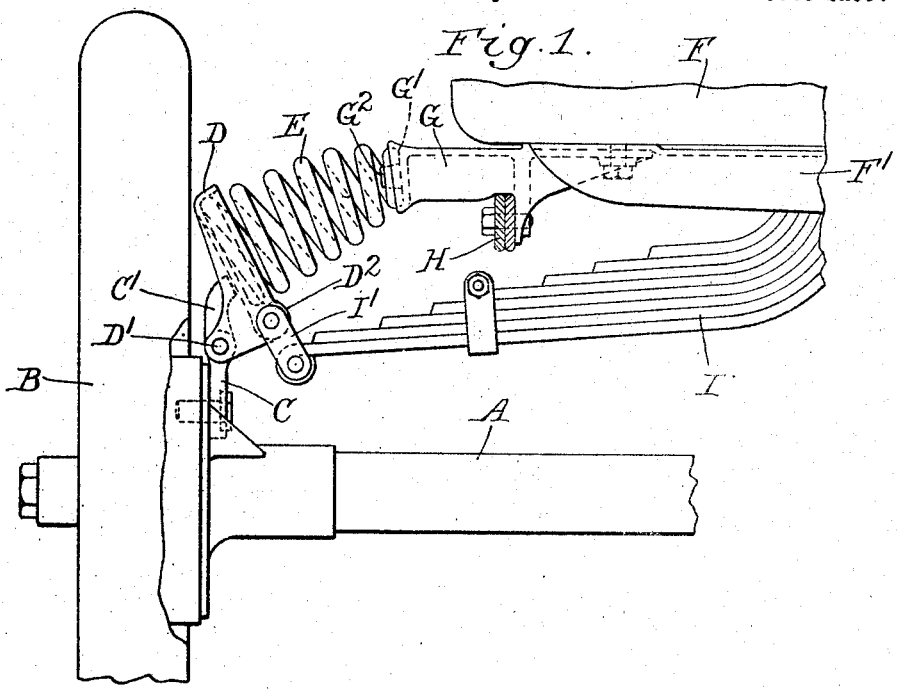
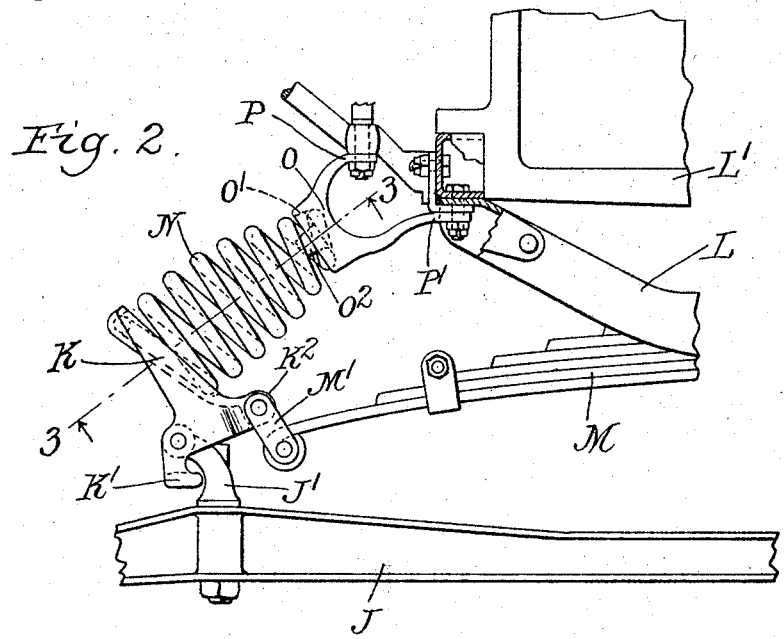
Inventor.
Lewis P. Halladay.
by Parker & Carter
Attorneys.

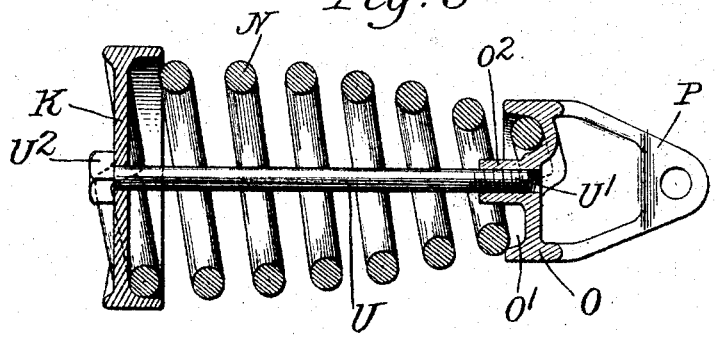
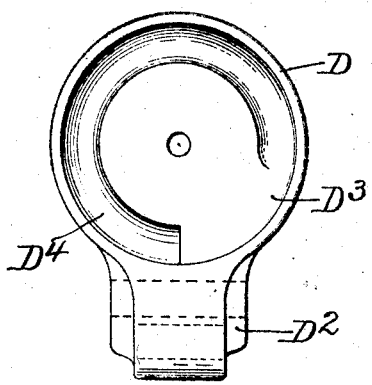
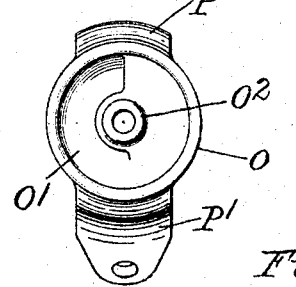
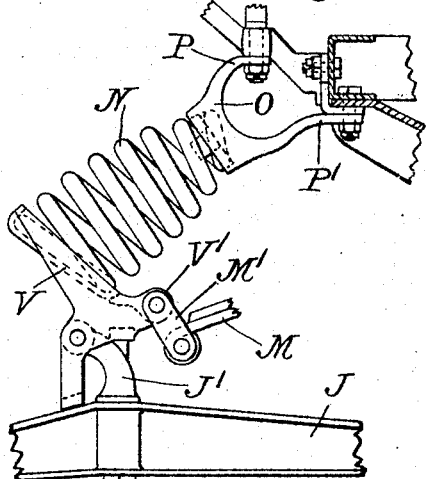
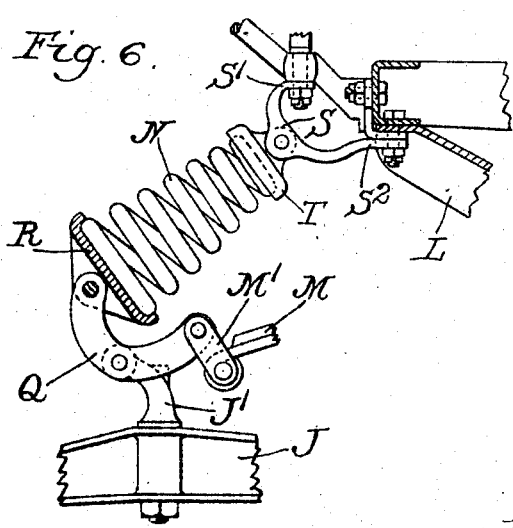

Patented Oct. 13, 1925.

1,556,931

UNITED STATES PATENT OFFICE.

LEWIS P. HALLADAY, OF DECATUR, ILLINOIS.

VEHICLE SUSPENSION.

Application filed July 5, 1923. Serial No. 649,404.

*To all whom it may concern:*

Be it known that I, LEWIS P. HALLADAY, a citizen of the United States, residing at Decatur, in the county of Macon and State of Illinois, have invented a certain new and useful Improvement in Vehicle Suspensions, of which the following is a specification.

This invention relates to a shock absorber for road vehicles and particularly to a shock absorber for automobiles.

When a road vehicle passes over bumps and other inequalities in the road a certain amount of shock is transmitted from the running gear to the vehicle itself. This causes vertical movement of the vehicle. This movement is sometimes very violent and damaging to the vehicle and uncomfortable to its occupants. Heretofore shock absorbers have dealt only with vertical shocks and vertical movement of the vehicle. There is associated with the vertical movement of the vehicle a lateral swaying or tipping. I have discovered that this lateral movement of the vehicle body either separately or in combination with the vertical movement is of the greatest importance. Heretofore shock absorbers have dealt only with the problem of absorbing the movement or shock in the vertical direction. The lateral movement of the vehicle body, that is to say the tipping and swaying of the body is extremely unpleasant to the occupants. It is this tipping movement which by reducing the stability of the vehicle has contributed in large part to many serious accidents. If the vehicle body can be prevented from swaying or tipping sideways with relation to the running gear, and if any unavoidable tipping can be cushioned, the stability of the vehicle is greatly improved and the chances of an accident is greatly reduced.

My shock absorber is therefore intended largely to absorb and reduce the lateral swaying and movement of the vehicle. It is not intended primarily to effect the vertical movement of the vehicle. In its preferred form it permits the ordinary spring of the vehicle body to act without any interference, and while in some measure the vertical movement of the vehicle is through the ordinary spring transmitted to my shock absorber, the shock absorber in some forms is entirely independent of the operation of the ordinary vehicle spring.

My invention is illustrated more or less diagrammatically in the accompanying drawings, wherein—

Figure 1 is a rear view of the rear axle of an automobile with my shock absorber in place;

Figure 2 is a similar view showing the front axle;

Figure 3 is a longitudinal cross section taken on line 3—3 of Figure 2;

Figure 4 is a plan view of the lower fitting of the shock absorber;

Figure 5 is a plan view of the upper fitting;

Figure 6 is a view similar to Figure 1, showing a modified form;

Figure 7 is a view of a further modification.

Like parts are designated by like characters throughout.

A is the axle of the vehicle. B is the wheel. C is a spring perch provided with an upwardly extending stop end $C^1$. D is a cup-shaped spring retaining plate pivoted at $D^1$ to the perch C. It is provided with a narrowed extension $D^2$ in which it is pivoted. It has in its upper face a depression $D^3$, which is preferably formed with a curved socket $D^4$ into which an end of the spring E is seated.

F is the body of the vehicle, provided with the frame member $F^1$. To the bottom of this frame member is secured an extension G to which a bumper bracket assembly H may be secured. In the form shown in Figure 1 the extension G is provided with a depression $G^1$, into which the upper end of the spring E fits. Within the depression $G^1$ is an upwardly extending boss $G^2$ about which the spring is seated.

I is the leaf spring of the vehicle. At its outer end it is movably secured by means of links $I^1$ to the bearing extension $D^4$ of the member D.

The form shown in Figure 2 is practically the same as that shown in Figure 1, except that it is adapted for use on the forward part of the vehicle.

J is an axle provided with the standard spring perch $J^1$. Pivotally mounted on this perch is a spring holding member K, which is generally similar to the member D. It is provided on its under side with a stop extension $K^1$ which is adapted to contact the spring perch and to limit excessive pivotal movement of the member K.

L is a vehicle frame upon which the vehicle body L¹ is mounted. M is a leaf spring of the usual type which is movably attached to the member K by means of links M¹ at the bearing extension point K² of the member K. N is a spring practically identical in form with the spring E in Figure 2, and it is secured to the member K in the same manner as the spring E is secured to the member D.

O is the upper spring holding member. It is provided with a socket portion O¹ from which extends an interiorly threaded boss O². The upper end of the spring N is seated in the socket portion and engages the boss.

The member O is provided with the upward perforated extension P and the laterally perforated extension P¹. These extensions are secured to the vehicle frame as shown.

As shown in Figure 6 a modified form of the structure is provided. The spring N is the same as shown in the previous figures, and the vehicle frame, the axle, and the spring perch are the same as that shown in Figure 2, but the spring mounting is slightly different.

Pivotally mounted on the spring perch is a crank Q, to the inner end of which by means of the links M¹, is movably attached the spring M.

At the outer end of the crank and pivotally mounted thereon is the spring holding member R. Fixed to the vehicle frame is a bearing support S, provided with an upper perforated extension S¹ and a laterally perforated extension S². Pivotally mounted in the member S is a spring holding member T. This form differs mainly from that of Figures 1 and 2 in that pivotal movement is provided at each end of the spring so that in its operation the spring may be compressed and may expand, and the spring holding plates at either edge will tilt and rotate so as to prevent any lateral distortion or bending of the spring, such as would take place to some extent in the form shown in Figures 1 and 2.

U is a holding rod screw threaded at one end as at U¹ and provided with a head at its opposite end as at U². This member forms no part of the operative spring structure, but when shock absorbers are originally made and shipped out to be installed, they are assembled so that the springs are under tension, and the function of the member U is to hold the springs under tension and retain the parts together. As soon as the shock absorber has been put in position as shown in Figures 1, 2, and 6, the member U is unscrewed and removed, and is not thereafter associated with the shock absorber.

In the form shown in Figure 7 the shock absorber and spring is mounted on a rigid platform. The upper end of the spring is exactly the same as that shown in Figure 2. The lower end mounting differs from that shown in Figure 2 only in that the spring holding platform is rigid with respect to the axle and spring perch, and therefore cannot be moved. There is thus no rotation of the parts of either the upper or lower end of the shock absorber and the shock absorbing spring is entirely independent in its operation from the vehicle supporting spring. In this form in place of the spring holding member K is substituted a member V which is mounted upon the spring perch J¹ and is fixed with relation thereto, and the links M¹ supporting the spring M are movably attached to the extension V¹ from the plate V.

Although I have shown an operative device, still it will be obvious that many changes in size, shape and arrangement of parts may be made without departing materially from the spirit of my invention, and I wish therefore that my showing be taken as in a sense diagrammatic.

The use and operation of my invention are as follows:

During the movement of the vehicle it is inevitable that it will sway to some extent from side to side. Such movement will be yieldingly resisted by the coil spring. This is true even should the spring act entirely by itself and without any co-operation with the ordinary vehicle spring, that is as here shown with the leaf spring. Coincident with the lateral tipping of the vehicle body some depression of the leaf spring takes place. This depression tends to rotate the lower shock absorbing spring platform inwardly toward the vehicle body, and thus additionally to compress this shock absorbing spring. Therefore as the vehicle body itself tips laterally it compresses the spring. The platform at the lower end of the shock absorbing spring tips inwardly and so co-operates to compress the spring and to cushion and reduce the lateral movement of the vehicle.

In the form shown in Figure 6 the operation is the same, except that the upper end of the shock absorbing spring is pivotally held so that the spring may move so as to hold itself always straight on its base and to prevent any lateral distortion of the spring such as might possibly take place in the forms shown in Figures 1 and 2.

I claim:

A spring suspension for a vehicle including an axle, a spring to take the vertical movements of the body, supports rising from the axle, bent levers pivoted to said supports, connections between the ends of the transverse springs and the levers, coil springs located between the levers and the body of the vehicle arranged to resist sidewise movements of the latter, spring seats for the upper ends of the coil springs connected with the body, spring seats for the lower ends of the coil springs, normal to the axes thereof, carried by the bent levers and located outside of and above the pivoted axes of the levers, whereby any rocking of a lever due to movement of the transverse spring tends to change the length of its coil spring in the direction of the axis of the latter and practically without lateral distortion thereof.

Signed at Chicago, county of Cook and State of Illinois, this 3rd day of July, 1923.

LEWIS P. HALLADAY.